United States Patent
Messerges et al.

(10) Patent No.: US 7,571,313 B2
(45) Date of Patent: Aug. 4, 2009

(54) AUTHENTICATION FOR AD HOC NETWORK SETUP

(75) Inventors: Thomas S. Messerges, Schaumburg, IL (US); Larry C. Puhl, Huntley, IL (US)

(73) Assignee: Motorola, Inc., Schaumburg, IL (US)

( * ) Notice: Subject to any disclaimer, the term of this patent is extended or adjusted under 35 U.S.C. 154(b) by 677 days.

(21) Appl. No.: 11/024,281

(22) Filed: Dec. 28, 2004

(65) Prior Publication Data

US 2009/0063852 A1     Mar. 5, 2009

(51) Int. Cl.
*H04L 9/32*       (2006.01)
*G06F 21/00*     (2006.01)

(52) U.S. Cl. .................. 713/156; 713/163; 380/270

(58) Field of Classification Search ............. 713/150, 713/155–156, 161, 163, 168–169, 171–173, 713/175–176, 164, 189; 380/270
See application file for complete search history.

(56) References Cited

U.S. PATENT DOCUMENTS

| | | | |
|---|---|---|---|
| 5,887,063 A | 3/1999 | Varadharajan | |
| 6,088,450 A * | 7/2000 | Davis et al. | 713/182 |
| 6,173,186 B1 * | 1/2001 | Dalley | 455/446 |
| 6,189,098 B1 | 2/2001 | Kaliski | |
| 6,473,078 B1 * | 10/2002 | Ikonen et al. | 345/211 |
| 6,532,540 B1 * | 3/2003 | Kocher | 713/158 |
| 6,624,760 B1 * | 9/2003 | Kinzel et al. | 340/870.11 |
| 6,901,509 B1 * | 5/2005 | Kocher | 713/158 |
| 6,948,066 B2 * | 9/2005 | Hind et al. | 713/168 |
| 6,968,453 B2 * | 11/2005 | Doyle et al. | 713/168 |
| 6,981,139 B2 * | 12/2005 | Enokida | 713/156 |
| 7,051,212 B2 * | 5/2006 | Ginter et al. | 713/193 |
| 7,068,789 B2 * | 6/2006 | Huitema et al. | 380/277 |
| 7,092,943 B2 * | 8/2006 | Roese et al. | 707/9 |
| 2003/0023849 A1 | 1/2003 | Martin, Jr. | |
| 2003/0050009 A1 | 3/2003 | Kurisko | |
| 2003/0108202 A1 | 6/2003 | Clapper | |
| 2003/0217150 A1 * | 11/2003 | Roese et al. | 709/225 |
| 2003/0217151 A1 * | 11/2003 | Roese et al. | 709/225 |
| 2003/0222819 A1 | 12/2003 | Karr | |
| 2004/0128500 A1 | 7/2004 | Cihula | |
| 2004/0140925 A1 * | 7/2004 | Kim | 342/28 |
| 2004/0199631 A1 * | 10/2004 | Natsume et al. | 709/225 |
| 2005/0036622 A1 * | 2/2005 | Hay et al. | 380/270 |
| 2006/0284732 A1 * | 12/2006 | Brock-Fisher | 340/573.1 |

OTHER PUBLICATIONS

"Stimulating cooperation in self-organizing mobile ad hoc networks",Levente Buttyán and Jean-Pierre Hubaux ,Oct. 2003, Mobile Networks and Applications, vol. 8 Issue 5,pp. 579-592, Publisher: Kluwer Academic Publishers.*

(Continued)

*Primary Examiner*—Gilberto Barron, Jr.
*Assistant Examiner*—Hadi Armouche
(74) *Attorney, Agent, or Firm*—Valerie M. Davis

(57) ABSTRACT

A device (110) performs a method 200 for authentication and Ad Hoc network setup. The device (110) receives (210) a first security configuration; receives (220) a second security configuration based on location; authenticates (230) at least a second node (110) having the first security configuration and the second security configuration; and forms (240) a network with the at least a second node (110).

19 Claims, 3 Drawing Sheets

OTHER PUBLICATIONS

"Authentication: An approach to certificate path discovery in mobile Ad Hoc networks", He Huang and Shyhtsun Felix Wu, Oct. 2003, Proceedings of the 1st ACM workshop on Security of ad hoc and sensor networks SASN '03, Publisher: ACM Press.*

Edith C.H. Ngai and Michael R. Lyu, "Trust-and Clustering-Based Authentication Services in Mobile Ad Hoc Networks", Department of Computer Science and Engineering, The Chinese University of Hong Kong, Jan. 2004.

Tseng, et al. "On Route Lifetime in Multihop Mobile Ad Hoc Networks", IEEE Transactions on Mobile Computing, vol. 2, No. 4, Oct.-Dec. 2003.

Korean Notice of Preliminary Rejection - English Translation, Oct. 29, 2008.

* cited by examiner

AUTHENTICATION FOR AD HOC NETWORK SETUP

CROSS-REFERENCE TO RELATED APPLICATIONS

The present application is related to the following U.S. applications commonly owned together with this application by Motorola, Inc.:

Ser. No. 11/024,381, filed Dec. 28, 2004, titled "Location-Based Network Access" by Taubenheim, et al.

FIELD OF THE INVENTION

The present invention relates generally to communication networks and more specifically to methods and apparatus for authentication for Ad Hoc network setup.

BACKGROUND OF THE INVENTION

It is desirable in increasing situations to rapidly deploy independent devices (also referred to herein interchangeably as nodes), and in particular wireless mobile devices to establish a communication network. Significant examples include establishing survivable, efficient dynamic communication for emergency/rescue operations, disaster relief efforts, and military networks. Such network scenarios cannot rely on centralized and organized connectivity, and can be conceived as applications of Mobile Ad Hoc Networks or (MANET). A MANET is defined herein as an autonomous collection of mobile nodes that may enable communication over relatively bandwidth constrained wireless links.

In many instances, a large number of devices will need to be included in a MANET. For example, thousands of wireless sensors may need to be deployed or set up within minutes after arriving at a scene such as an emergency location. These sensors may be used, for instance, to monitor various parameters such as intrusion, environmental conditions and personnel at emergency locations. It is desirable that the sensors be deployed securely to prevent an attacker from joining, disrupting, or monitoring the network. Complicating this problem is that sensors from different services (fire, police, FBI, etc.) may need to be organized into a single network while preventing attackers (e.g., terrorists) from joining the network.

Thus, there exists a need for means for authenticating devices in order to establish an Ad Hoc network between the authenticated devices.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
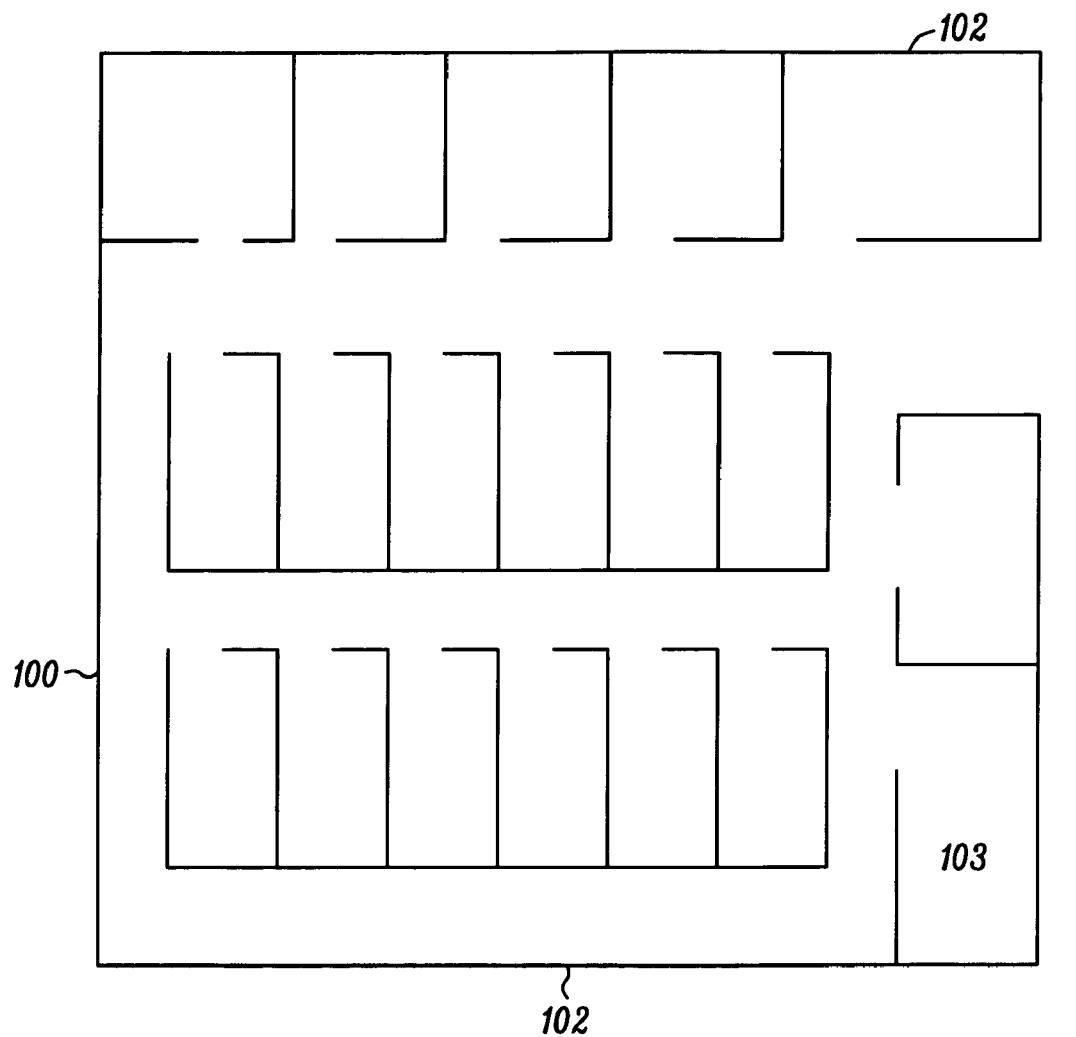
FIG. 1 illustrates a schematic diagram an event for which a network in accordance with the present invention is needed.
Figure 1:
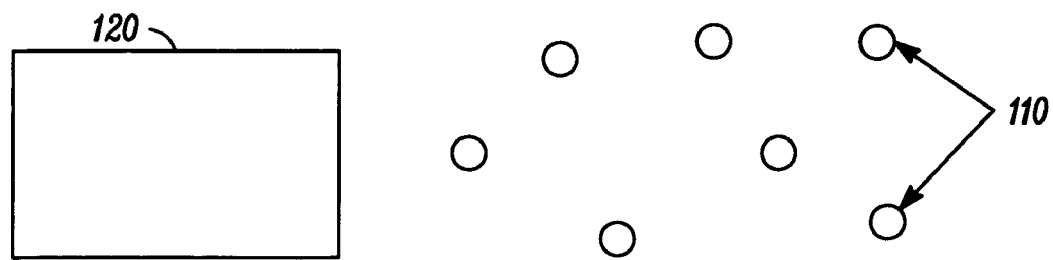

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking, pursuant to these various embodiments, a node, for instance a wireless sensor, may mutually authenticate with another node and, thereafter, the two nodes may form an Ad Hoc wireless network at an emergency site, for example. For performing authentication to establish a secure network, each node must receive a pre-emergency security configuration that may be, for instance, a digital certificate or a network key. At the emergency site, each node must receive a second (emergency) security configuration that again may be a digital certificate or a network key, wherein the emergency configuration is received based upon the location of the node, e.g., with respect to a master device that provides the emergency configuration. Mutual authentication to establish the network may then be performed by two nodes having both the pre-emergency and the emergency security configurations.

Referring now to the drawings, and in particular to FIG. 1, a site (for instance of an emergency), nodes having users desiring to form a network, and a master device are shown and indicated generally at 100, 110 and 120, respectively. Those skilled in the art, however, will recognize and appreciate that the specifics of this illustrative example are not specifics of the invention itself and that the teachings set forth herein are applicable in a variety of alternative settings. For example, since the teachings described do not depend upon the site or triggering event at which the teachings are implemented, they can be applied to any location and in response to any event although the examples given specifically apply the teachings at an emergency location in an office building. As such, alternative implementations at different sites and in response to different events are contemplated and are within the scope of the various teachings. Moreover, since the teachings described do not depend upon the apparatus used, they can be applied to any apparatus although the examples given specifically apply the teachings to wireless devices and in particular wireless sensors. As such, alternative implementations using different apparatus such as various wireline apparatus are contemplated and are within the scope of the various teachings.

In order to show a practical example of these various teachings, a floor plan of an interior of an office building 100, with perimeter wall 102 enclosing a plurality of offices 103 (only one office labeled) is shown. Let us assume for purposes of this illustration that some type of emergency (e.g., a fire, a terrorist attack, etc.) has occurred at this location, which has necessitated the creation of an Ad Hoc network, and in particular a wireless Ad Hoc network.

Circular objects 110 (only two are labeled) represent devices and in particular wireless mobile devices that are approaching or have arrived at the emergency scene and that are candidate nodes for forming a wireless MANET in accordance with the teachings of the present invention. Devices 110 are ideally each configured for wireless communications (e.g., having a conventional transceiver and some level of intelligence for signal processing and networking of data) and may include, but are not limited to, laptop computers, wireless communication devices including cellular telephones, wireless sensors, etc. and any combination thereof. For purposes of this illustration, devices 110 are wireless sensors that may be used to gather various data and/or to measure various parameters such as, for instance, temperature, the existence of smoke, fire and other hazardous substances, movement, etc. Moreover, sensors 110 may be attached to (e.g., coupled to and/or included or incorporated within) an article of clothing, for example of a public safety personnel, attached to a radio or other communication device, attached to a vehicle, and the like. Skilled artisans will realize that only a few such sensors 110 are shown for clarity of illustration. However, in a practical implementation, there may be hundreds and perhaps thousands of such sensors available for use in creating a MANET at location 100.

Further illustrated is a device 120 (also referred to herein as a master device) that may be used in accordance with the detailed teachings below to provide a security configuration for sensors 110 at the emergency site 100. Accordingly, at a minimum, master device 120 will be configured with communication capabilities, ideally in accordance with the above description, for wireless communication with sensors 110. The transceiver (i.e., the receiver portion) of master device 120 is ideally configured for receiving a plurality of location parameters, wherein a "location-based parameter" is any property of a received signal that may be used to infer the location of one or more sensors 110. Moreover, master device 120 further ideally includes location-finding equipment for determining a location of a node based on the location parameters, and logic circuitry for determining a restricted geographic area, and determining if the location of the node is within the restricted geographic area. The transceiver (i.e., the transmitter portion) of master device 120 is further ideally configured for transmitting the security configuration to sensors 110 at the emergency site in a centralized manner as will be described below in more detail.

One master device 120 is shown for ease of illustration. However, skilled artisans will realize that implementation of additional master devices is within the scope of the present invention. In addition, the functionality of the master device may be included in one device (as shown) or spread across several devices. Furthermore, master device 120 may also be configured for joining the Ad Hoc network.

Figure 2:
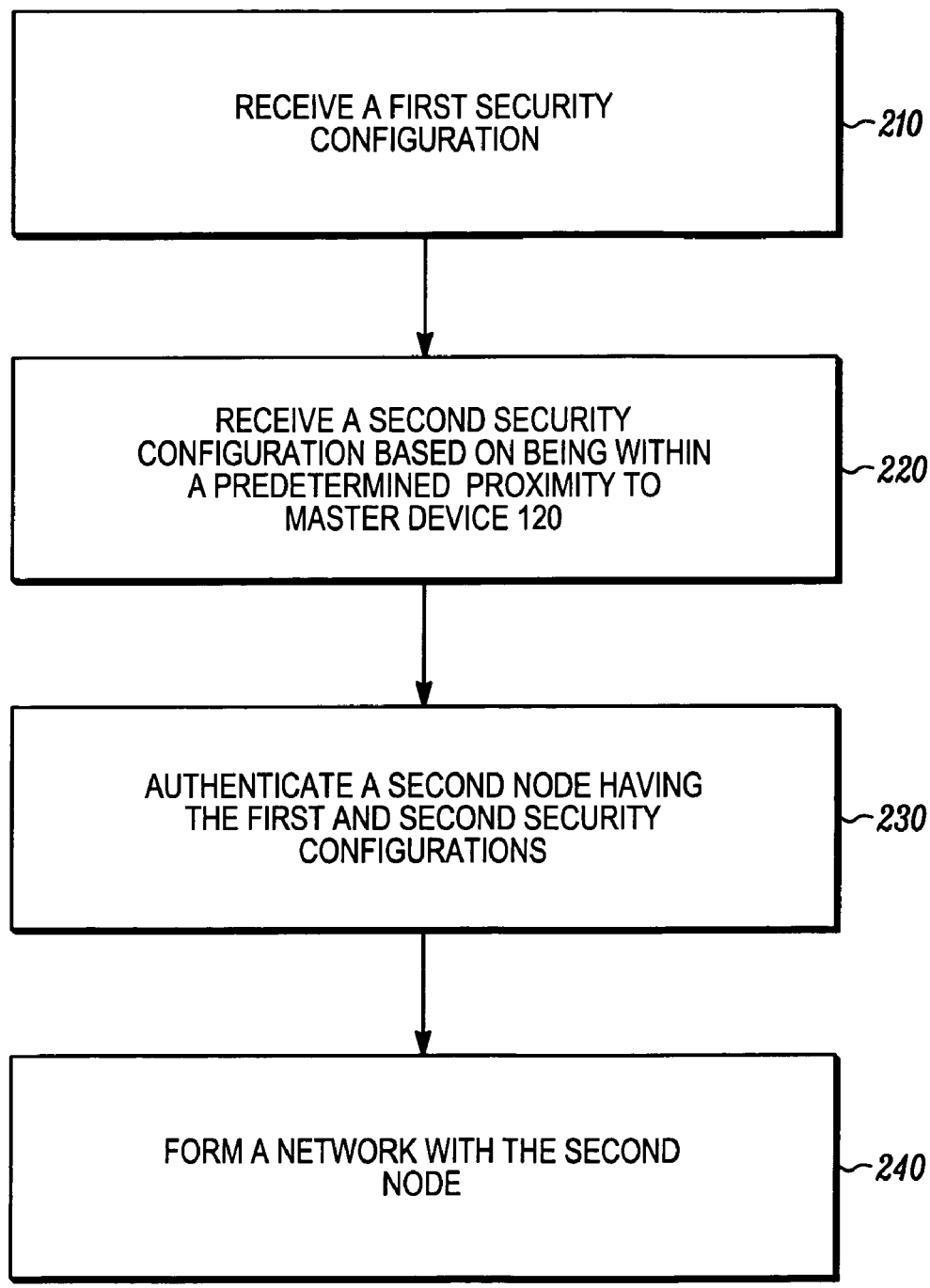
FIG. 2 is a flow diagram illustrating a method for authentication to establish a network in accordance with the present invention.

To aid in clarity, the foregoing teachings may be divided into three phases: a pre-emergency (or pre-event) configuration phase, an emergency (or event) configuration phase, and a distribution or network setup phase. In general, each candidate node 110 performs one or more of the steps illustrated in FIG. 2 during these three phases so that it can be included in the formation of the MANET. In particular during the pre-emergency phase, a sensor 110 receives (210) a first security configuration. During the emergency configuration phase, the sensor 110 receives (220) a second configuration based on location, e.g., based on being within a predetermined proximity to a master device 120. Finally during the distribution phase, the sensor 110 authenticates (230) another sensor 110 having the first and second security configuration and forms (240) the network with the other sensor upon becoming authenticated by that other sensor 110.

We now turn to the particulars of steps 210-240 of method 200. During the pre-emergency configuration phase a first security configuration is provided to a device. Possession of the pre-emergency first security configuration gives proof that a device is a legitimate device that is authorized to provide service for a particular system, for example in given regions (e.g., city, state, county, etc.) or for given public safety agencies (e.g., police, fire, FBI, etc.). The first security configuration may comprise, for example, a digital certificate and associated security material, if a public-key cryptosystem is used, or a shared network key, if a symmetric key cryptosystem is used. The type of cryptosystem used would depend on the desired properties of the system. For example, in general, public-key cryptosystems are likely to be more complex to implement but may lead to easier mechanisms for key management resulting in increased security and lower maintenance costs. Those skilled in the art of security system design will realize that the pre-emergency configuration phase involves procedures typically used for issuing a unique public or symmetric key to a device. Key management issues can be handled using standard techniques.

The physical installation of a pre-emergency digital certificate or network key can be accomplished with an electrical or wireless connection. In the case of a digital certificate, the secrecy of the private key used to sign the certificate needs to be maintained by a trusted authority. This trusted authority needs some way to ensure that it is signing a certificate for a particular device (i.e., the target device—not a rogue device in the vicinity). One way to ensure communication with a targeted device is to use an electrical connection. Alternately, use of a low-range radio frequency (or shielded radio frequency) is also possible. Regular updating of a certificate or network key is recommended and can be done in the same way as the initial loading. In a typical emergency services situation, the trusted authority could be operated by a regional authority, such as the local or state public-safety administration office.

During an actual event (or emergency), e.g., the emergency phase, a trusted authority at the site (e.g., the master device 120), provides devices with a second security configuration. Possession of the second security configuration gives a device a further means to prove that it is a legitimate device that is authorized to provide service for a particular location (e.g., the emergency site). The trusted authority provides a second security configuration based on location. More specifically, the trusted authority provides the second security configuration only to devices that are within a predetermined proximity to the trusted authority. The trusted authority may require an action by the device or a user of the device prior to issuing the second configuration. Alternatively, the trusted authority may automatically provide the second security configuration upon the device coming within the predetermined proximity and also, optionally, upon verifying that the device has the first security configuration.

As with the first security configuration, the second security configuration may comprise, for example, a digital certificate and associated security material or a network key. Those skilled in the art of security system design will realize that the second configuration phase involves the procedures typically used for issuing a unique public or symmetric key to device. Key management issues can be handled using standard techniques. Moreover, since this second security configuration applies to a situation that is likely temporary in nature, regular updating of the certificate or network key may not be needed. However, if updating is required, standard certificate revocation and issuing procedures, known to those skilled in the art, may be followed.

Location of a device may be determined by the trusted authority or by a separate device and the information then communicated to the trusted authority (using any suitable means) for determining the device's proximity to the trusted authority. Skilled artisans will readily appreciate that any suitable location methodology may be used to determine location and proximity information for the device, including but not limited to methods based on a signal strength parameter, a timing parameter, an angle of arrival parameter, triangulation algorithm results, hop count (e.g., located within a single hop), or an out-of-band localized source such as audio, motion, light, etc. Also, proximity can be further authenticated by using multiple sources for the information (e.g., the triangulation algorithm may rely on a majority vote amongst unauthenticated nodes or a threshold number of nodes to confirm, beyond a reasonable doubt, the close proximity of a candidate node prior to giving it the network key or digital certificate).

During the network setup phase, devices may, for instance, automatically "form" a secure network by using both the first and second security configurations. "Forming" a network is meant herein to include initially establishing a network by one or more devices having the first and second configurations and to also include any node having the first and second security configuration subsequently joining the already established network. For example, in the case of a system based on public-key cryptography two devices may first use the digital certificates associated with the first security configuration in a first authentication procedure (e.g., a certificate-based key establishment protocol, such as the authenticated Diffie-Hellman protocol). Once the two devices establish a secure channel based on the first security configuration, they both are assured that the other device is a legitimate device authorized to operate in a particular region for a particular system.

Next, the two devices may use the digital certificates associated with the second security configuration in a second authentication procedure. One possibility would be for this second procedure to be a certificate-based key establishment protocol secured with the session key established during the first authentication procedure. Skilled artisans will realize that other techniques to bind the first and second authentication procedures in an efficient manner can also be used.

Figure 3:
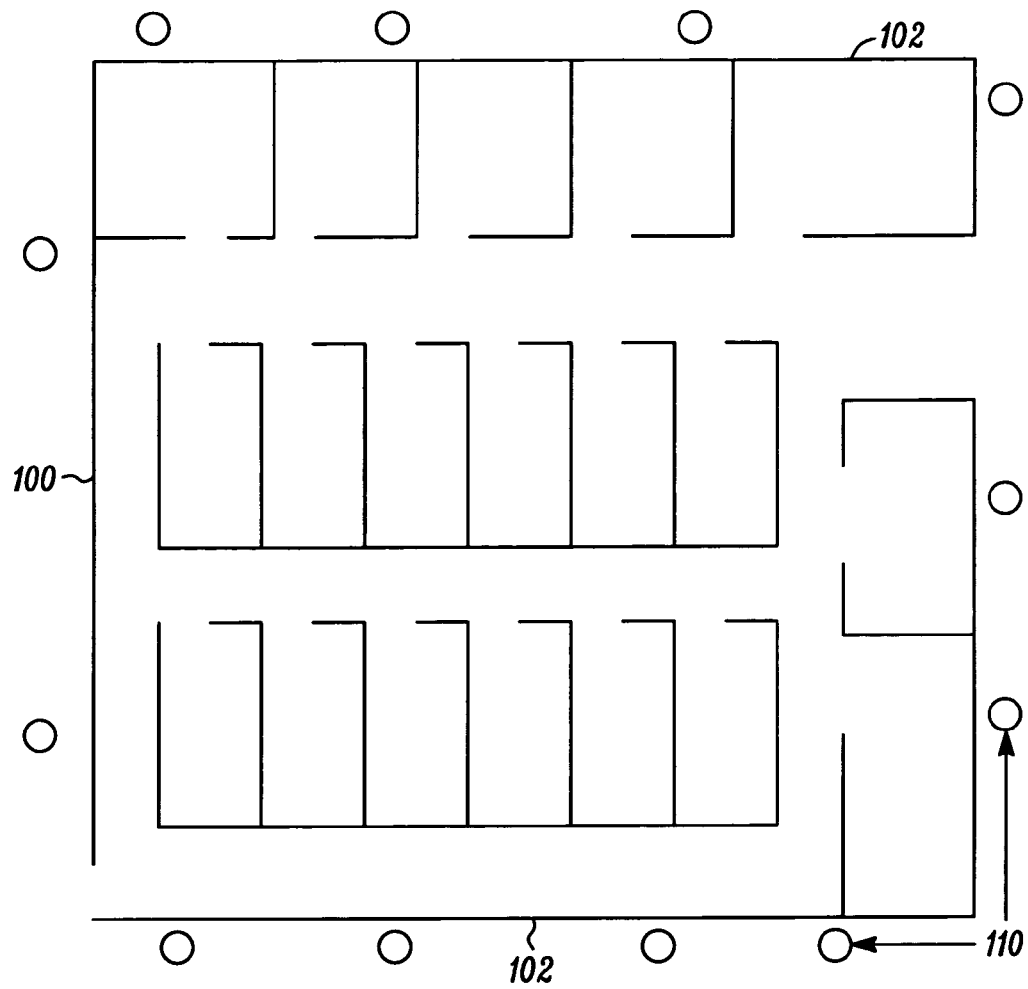
FIG. 3 illustrates a network that has been established in accordance with the present invention.

Once two devices establish a secure channel based on the first and second security configurations, they both are assured that the other device is not only legitimate but is also authorized to provide service for a particular location (e.g., the emergency site). FIG. 3 illustrates one of many configurations for deploying sensors 110 into the secure network. As illustrated, the devices are deployed around the outer perimeter of building 100. However, it should be realized by those of ordinary skill in the art that some or all of the sensors could be deployed inside of the building. Finally, as mentioned above master device 120 may also be included in the network.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for authentication for use in a first node, the method comprising the steps of:
    receiving a first security configuration into the first node;
    receiving a second security configuration based on location into the first node after the first security configuration is verified; and
    authenticating at least a second node already having both the first and the second security configurations, wherein both the first and the second security configurations are used in the authenticating step in order to form a network with the at least a second node.

2. The method of claim 1 further comprising the step of being authenticated by the at least a second node using the first and the second security configurations in order to form the network with the at least a second node.

3. The method of claim 2, wherein the first and the at least a second nodes are wireless devices that form the network.

4. The method of claim 1, wherein the first security configuration is one of a network key and a digital certificate.

5. The method of claim 1, wherein the second security configuration is one of a network key and a digital certificate.

6. The method of claim 1, wherein location is determined based on a signal strength parameter.

7. The method of claim 1, wherein location is determined based on a time-of-arrival parameter.

8. The method of claim 1, wherein location is determined based on an angle-of-arrival parameter.

9. The method of claim 1, wherein the second security configuration is received based on being within a predetermined proximity to a device that provides the second security configuration.

10. The method of claim 9, wherein the second security configuration is automatically received upon coming within the predetermined proximity of the first location.

11. An apparatus for authenticating wireless nodes, the apparatus comprising:
    means for receiving a first security configuration into the apparatus;
    means for receiving a second security configuration based on location into the apparatus after the first security configuration is verified; and
    means for authenticating at least a first wireless node already having both the first and second security configurations, wherein both the first and the second security configurations are used in the authenticating step in order to form a network with the at least a first wireless node.

12. The apparatus of claim 11, wherein the apparatus is a wireless device.

13. The apparatus of claim 11, wherein the apparatus is attached to an article of clothing.

14. The apparatus of claim 11, wherein the apparatus is attached to a radio.

15. The apparatus of claim 11, wherein the apparatus is attached to a vehicle.

16. The apparatus of claim 11, wherein the apparatus is further configured for receiving the second configuration based on being within a predetermined proximity to a device that provides the second security configuration.

17. The apparatus of claim 11, wherein the first security configuration is one of a network key and a digital certificate.

18. The apparatus of claim 11, wherein the second security configuration is one of a network key and a digital certificate.

19. A system for authenticating wireless nodes, the system comprising:
    at least a first and second apparatus each comprising:
    means for receiving a first security configuration;
    means for receiving a second security configuration based on location after the first security configuration is verified;
    means for authenticating at least one wireless node already having both the first and second security configurations, wherein both the first and the second security configurations used in the authenticating step to form a network with the at least one wireless node.

* * * * *